United States Patent

[11] 3,603,511

[72] Inventors Arthur W. La Pierre
 Madison;
 Edward A. Kull, Brick Township, both of, N.J.
[21] Appl. No. 818,660
[22] Filed Apr. 23, 1969
[45] Patented Sept. 7, 1971
[73] Assignee Monsanto Company
 St. Louis, Mo.

[54] HEAT SEATED ANCHORABLE PERFORATED HOSE
 7 Claims, 7 Drawing Figs.

[52] U.S. Cl. .................................................. 239/450,
 239/276, 239/547
[51] Int. Cl. ............................................. B05b 15/00
[50] Field of Search .......................................... 239/279,
 547, 550, 450, 269, 145, 276; 138/115, 178;
 206/69, 17.5, DIG. 8; 248/75, 85, 87, 71

[56] References Cited
 UNITED STATES PATENTS
1,965,800 7/1934 Foster ........................ 206/69

| 3,085,129 | 4/1963 | Anderson | 248/71 X |
| 3,425,632 | 2/1969 | Stout | 239/276 X |
| 2,747,935 | 5/1956 | Szantay | 239/450 UX |
| 2,749,180 | 6/1956 | Andrews | 239/450 |
| 3,195,818 | 7/1965 | Herberg | 239/276 |

FOREIGN PATENTS

| 966,253 | 8/1964 | Great Britain | 206/DIG. 8 |
| 741,526 | 12/1955 | Great Britain | 239/450 |
| 903,304 | 8/1962 | Great Britain | 239/450 |

Primary Examiner—Lloyd L. King
Assistant Examiner—John J. Love
Attorneys—James L. Lewis, Arthur E. Hoffman and Russell H. Schlattman ABSTRACT: An improvement in a perforated hose comprising a heat seal at one end thereof in combination with a substantially flat disc portion having at least one aperture therethrough, thereby being adapted to receive anchoring means, e.g., a spike or the like.

INVENTORS
Arthur W. LaPierre
Edward A. Kull
BY James L. Lewis
Attorney

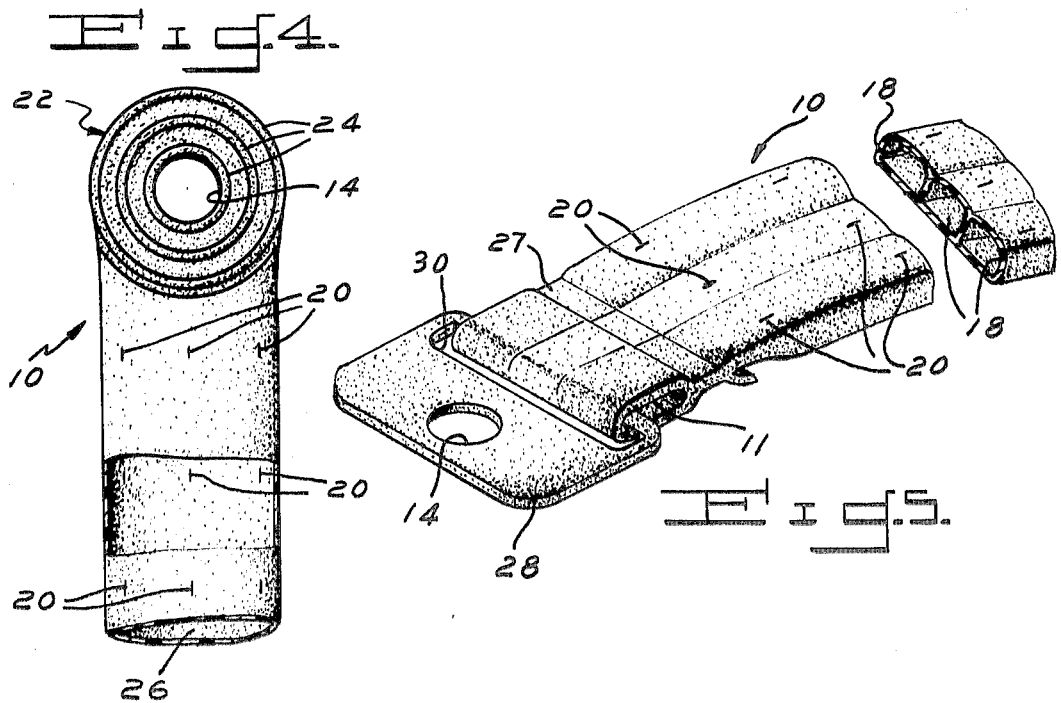
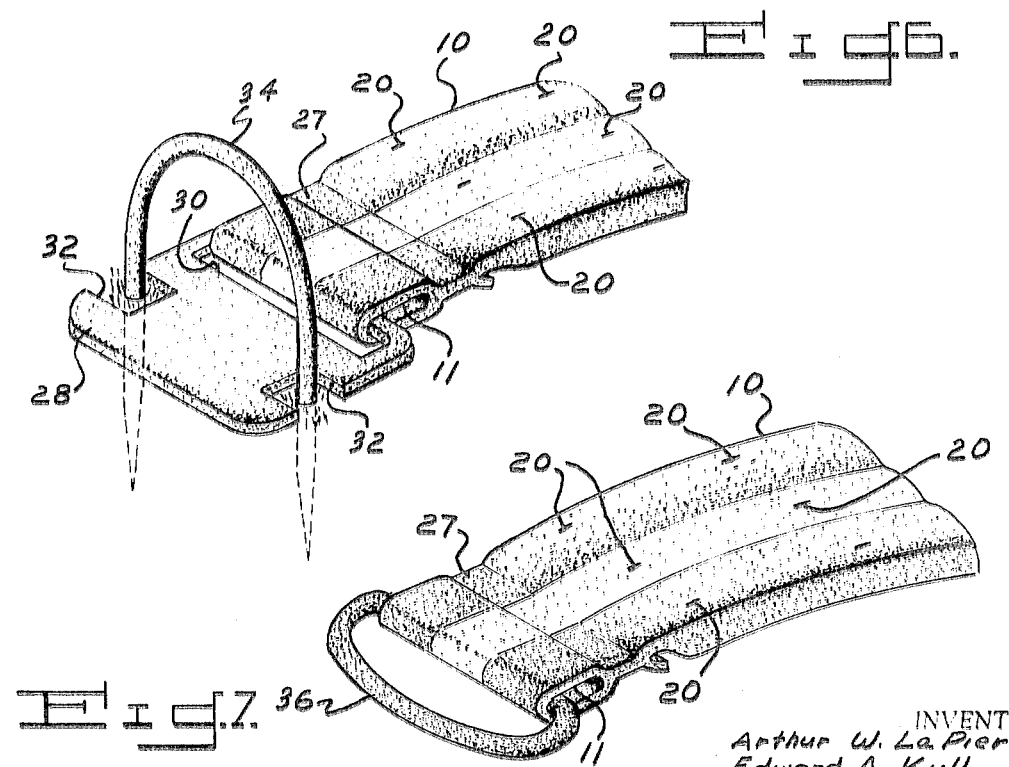

3,603,511

HEAT SEATED ANCHORABLE PERFORATED HOSE

BACKGROUND OF THE INVENTION

1. Field of the Invention

The present invention relates to perforated hose and in particular to an improvement therein comprising in combination a heat seal and an aperture suitable for receiving anchoring means.

2. Description of the Prior Art

Watering hoses having a multiplicity of perforations throughout their length such that a fine spray can be delivered over the full length of the hose are well known. These hoses may be used for sending the water spray into the air from which it falls to the ground, in which case they are generally referred to as sprinkler hoses or they may be positioned so as to send water directly into the ground, a configuration usually referred to as soaker hoses. Other hoses are also known which combine these two methods, sending part of the water into the air and part directly into the ground. This is accomplished by having perforations distributed about the total perimeter. Other hoses, which are of a substantially flattened ribbon configuration, have perforations on only one side of the ribbon. Where this ribbonlike form has been used, it has been a common problem to so arrange it that it is untwisted in use, that is, that all the water is directed either upward or downward as desired. This generally requires an inconvenient setting-up procedure wherein the user must traverse the full length of the hose, untwisted it and turning it in the desired direction. Once this procedure has been accomplished and the water has been turned on, it often happens that the water pressure inside the hose is sufficient to move the hose into undesired configurations or to locations away from those the user intends to water. This latter difficulty, of course, is also encountered with hose having perforations about the entire perimeter. For purposes of convenience and to avoid redundancy the several types of hoses referred to above will hereinafter be described simply as "perforated hose."

These hoses are closed off at the end distal to the water faucet by an end coupling, generally constructed of metal. Such couplings are economically disadvantageous in that they are relatively costly in themselves and require a complex operation for installation in the hose end, thereby adding to the cost of fabrication of the hose, which cost must be passed along to the consumer.

It is, therefore, an object of this invention to provide a means for closing off the end of a perforated hose without the need for a separate end coupling.

It is a further object of this invention to provide a perforated hose which can be laid out by the user quickly and easily and which while in use will be restrained from motion due to the force of water pressure within.

SUMMARY OF THE INVENTION

These and other objects which will be apparent from the following detailed description are attained by providing an improved perforated hose having a seal at one end thereof and an aperture through which an anchoring means, such as a spike or the like, may be driven into the ground. More particularly, this invention relates to an improvement in a hose, said hose comprising an elongate thermoplastic tube having at least one internal longitudinal conduit, an opening at one end of the tube for the admission thereinto of fluid, a closure at the end distal to the opening for damming the fluid and a multiplicity of perforations therein situated between the opening and the closure, wherein the improvement comprises a heat seal as the closure and, proximate to the heat seal and in combination therewith, apertured means adapted for the acceptance of anchoring means to situated that at least a portion of the heat seal is interposed between the apertured means and the perforations.

BRIEF DESCRIPTION OF THE DRAWING

FIGS. 2-7 show various embodiments of the hoses of this invention.

FIG. 2 is a view, in perspective, showing the heat sealed end of a hose of this invention having an aperture through the heat seal and a spike anchoring means passing through the aperture.

FIGS. 3-4 are perspective views of the closed ends of single and multiple conduit perforated hoses heat sealed in accordance with this invention and having an aperture through the heat seal.

FIGS. 5-7 are perspective views of the closed ends of perforated hoses heat sealed in accordance with this invention in such a way that a loop is formed at the closed end through which is attached an apertured plate or ring for accepting anchoring means.

DESCRIPTION OF THE PREFERRED EMBODIMENTS

The material of which the hoses of this invention are constructed may be any thermoplastic material capable of being heat sealed. Generally, these hoses will be comprised of vinyl chloride polymers containing various fillers, extenders, stabilizers and the like well known to those of ordinary skill in the art. Other materials, such as polyolefins, e.g., polyethylene, polypropylene, etc., polystyrenes, copolymers and blends of the foregoing and the like may, of course, be employed.

Figure 1:
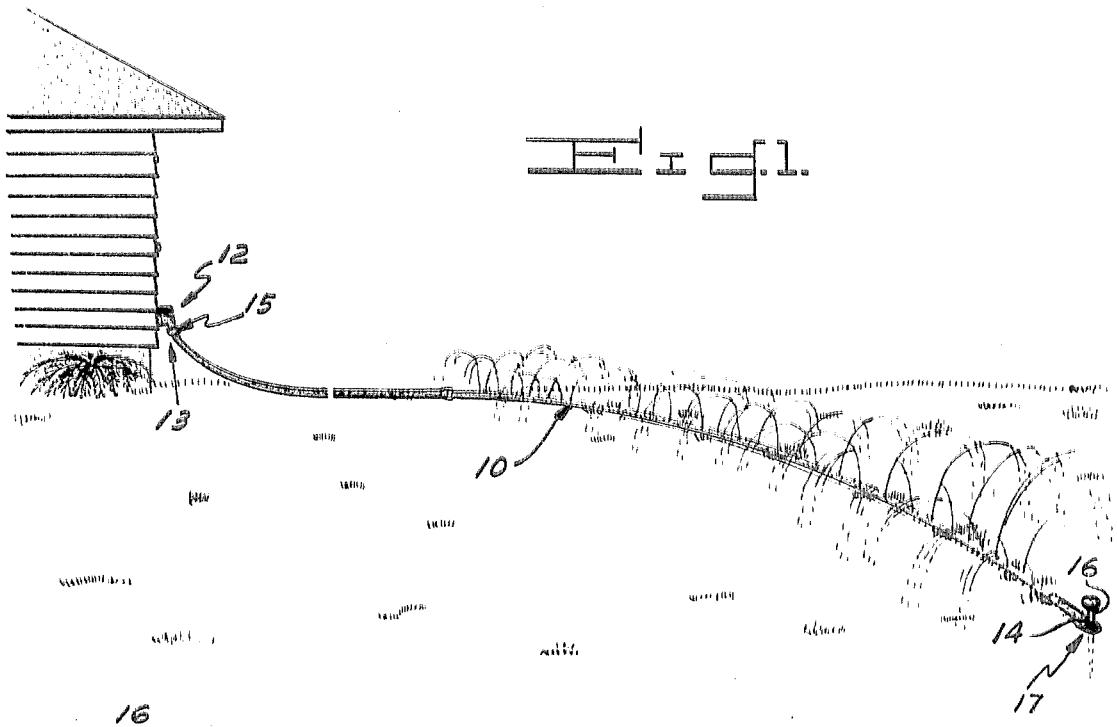
FIG. 1 is a view showing a perforated hose of this invention in use having its open end attached to a faucet and its closed end secured to the ground by means of a stake.

Referring now to the drawings, FIG. 1 shows a perforated hose 10 of this invention in use, watering a lawn. The hose is attached at its open end 13 to a conventional faucet 12 with conventional coupling means 15 and is anchored into the ground at its closed end 17 through an aperture 14 with anchoring means 16.

Figure 2:
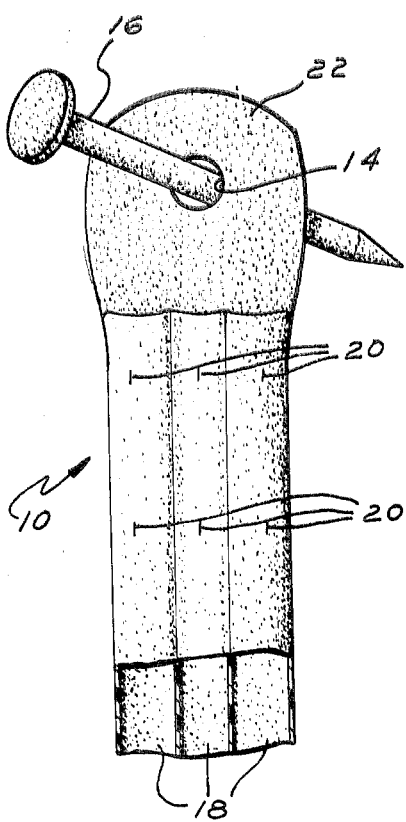

FIG. 2 shows the hose 10 having three internal longitudinal conduits 18 through which fluid may be conducted, a multiplicity of perforations 20 through which the fluid, e.g., water, is emitted in use, a substantially flat heat seal 22 having an aperture 14 therethrough for acceptance of anchoring means 16, depicted here as an ordinary spike. The anchoring means may be of any suitable material such as metal or plastic capable of being driven into the ground and of restraining the hose in use.

Figure 3:
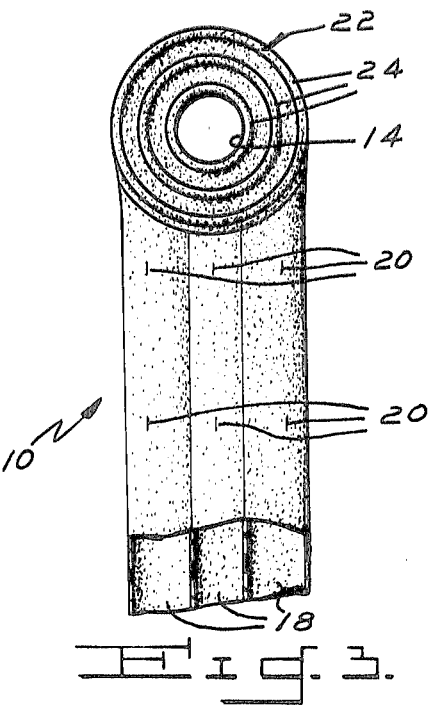

FIG. 3 shows another, more preferred, embodiment of the present invention wherein concentric circular ridges 24 have been molded into the heat seal during the heat sealing process providing additional strength and stiffness thereto. The ridges 24 have the additional advantage of taking up the flash formed during heat sealing thereby permitting the diameter of the heat seal to be substantially equal to the width of the hose thus facilitating packaging and storage of the hose as well as making the product more aesthetically appealing.

FIG. 4 depicts another embodiment of the present invention wherein the hose 10 has a single internal longitudinal conduit 26 and perforations 20 are disposed about the entire circumference of the hose 10. It should be noted that the number of internal longitudinal conduits present in the hose is not critical to the present invention, but that hoses having one, two or three conduits are preferred and those having three conduits are most preferred.

FIG. 5 depicts another embodiment of the present invention wherein the hose 10 forms a loop 11 closed by the heat seal 27. This loop passes through a plate 28 having a slot 30 through which hose 10 passes and an aperture 14 for accepting anchoring means (not shown). Plate 28 may be constructed of any suitable material such as metal or plastic having sufficient strength to restrain hose 10 under the force of the water pressure inside the hose when in use.

Another embodiment of the present invention is shown in FIG. 6 in which the apertured means of the present invention is a plate 28 having a plurality of generally U-shaped slots 32 for the acceptance of anchoring means which may, for example, be U-shaped anchoring means 34.

FIG. 7 depicts another embodiment of the present invention wherein a ring 36 is substituted for the plate 28 of FIGS. 5 and 6.

In general, any type of heat sealing may be employed in the practice of this invention. It is preferred, however, that the heat seal be of the dielectric (radio frequency) variety. Other types of heat seals, such as ultrasonic and thermal, can, under some circumstances, be employed, but in such a case great care is necessary in order to avoid decomposing or melting away the plastic material of which the hose is constructed. Such difficulties are substantially avoided by use of a dielectric heat seal.

It will be obvious that many variations may be made in the practice of this invention and in the articles set forth above without departing from the spirit and scope thereof.

What is claimed is:

1. In combination with a hose comprising an elongate thermoplastic tube having:
   A. at least one internal longitudinal conduit,
   B. an opening at one end for the admission of fluid into the conduit,
   C. a closure at the end distal to the opening for damming the fluid and
   D. a multiplicity of perforations therein situated between the opening and the closure, the improvement which comprises a heat seal as the closure; said heat seal having apertured means therethrough adapted for the insertion and extraction before and after use, respectively, of readily separable anchoring means, the apertured means being so situated that at least a portion of the heat seal is interposed between the apertured means and the perforations; said heat seal further having a plurality of concentric ridges molded thereinto surrounding the apertured means whereby additional strength and stiffness is imparted to the heat seal and the lateral dimension of the heat seal is substantially equal to the width of the hose.

2. An improved hose as in claim 1 wherein the thermoplastic of which the hose is constructed comprises polyvinyl chloride.

3. An improved hose as in claim 1 having three internal longitudinal conduits.

4. An improved hose as in claim 1 wherein the perforations are distributed about the total perimeter thereof.

5. An improved hose as in claim 1 wherein the tube is of a substantially flattened ribbon configuration having perforations on one side thereof.

6. An improved hose as in claim 3 wherein the tube is of a substantially flattened ribbon configuration having perforations on one side thereof.

7. An improved hose as in claim 1 wherein the heat seal is a dielectric (radio frequency) heat seal.